United States Patent
Mathieu

Patent Number: 5,826,967
Date of Patent: Oct. 27, 1998

[54] ILLUMINATING SLEEVE FOR A CIGAR LIGHTER, IN PARTICULAR FOR A MOTOR VEHICLE

[75] Inventor: Daniel Mathieu, Mazamet, France

[73] Assignee: Valeo Vision, Bobigny Cedex, France

[21] Appl. No.: 687,469

[22] PCT Filed: Dec. 7, 1995

[86] PCT No.: PCT/FR95/01629

§ 371 Date: Oct. 7, 1996

§ 102(e) Date: Oct. 7, 1996

[87] PCT Pub. No.: WO96/17749

PCT Pub. Date: Jun. 13, 1996

[30] Foreign Application Priority Data

Dec. 8, 1994 [FR] France .................................. 94 14897

[51] Int. Cl.$^6$ ............................................. F21V 33/00
[52] U.S. Cl. ........................ 362/92; 362/32; 362/80; 362/26; 362/30
[58] Field of Search ........................ 362/32, 80, 26, 362/30

[56] References Cited

U.S. PATENT DOCUMENTS

| | | |
|---|---|---|
| 2,701,297 | 2/1955 | Thibault .................................. 362/32 |
| 4,079,242 | 3/1978 | Seibel . |
| 4,163,428 | 8/1979 | Ishikawa .................................. 116/288 |
| 4,205,367 | 5/1980 | Arnold, III .................................. 362/61 |
| 4,218,726 | 8/1980 | Fukasawa et al. .......................... 362/23 |
| 4,625,262 | 11/1986 | Sakakibara et al. ....................... 362/26 |
| 4,713,733 | 12/1987 | Fitz et al. .................................. 362/80 |
| 5,030,811 | 7/1991 | Von Gaisberg et al. ............... 219/268 |
| 5,295,049 | 3/1994 | Terada ...................................... 362/27 |

FOREIGN PATENT DOCUMENTS

| | | |
|---|---|---|
| 488 501 | 9/1991 | European Pat. Off. . |
| 547 929 | 6/1993 | European Pat. Off. . |
| 2 169 587 | 9/1973 | France . |
| 2 320 211 | 7/1976 | France . |
| 2 595 132 | 9/1987 | France . |
| 2 630 057 | 4/1988 | France . |
| 1 381 060 | 1/1975 | United Kingdom . |

Primary Examiner—Ira S. Lazarus
Assistant Examiner—David Lee
Attorney, Agent, or Firm—Morgan & Finnegan, LLP

[57] ABSTRACT

The illuminating sleeve includes a rear face which is covered by an opaque mask.

6 Claims, 1 Drawing Sheet

ILLUMINATING SLEEVE FOR A CIGAR LIGHTER, IN PARTICULAR FOR A MOTOR VEHICLE

The present invention relates to cigar lighters, especially for a motor vehicle, and more particularly it relates to the illuminating sleeve which is part of such a cigar lighter, of the kind which is described, for example, in the document FR-A-2 630 057.

Such a cigar lighter (FIG. 1) comprises a lighter body 1 which serves to receive a heating plug 2, and an illuminating sleeve 7 which is lit by operation of the switch for the lights and indicators of the vehicle.

The body of the illuminating sleeve 7 is provided on its front face with an illuminating collar portion 8 that surrounds the mouth of the lighter body 1, which is provided with a bimetal fastening element (which has no reference numeral).

The sleeve 7 serves for fastening the cigar lighter to a fixed wall P of the vehicle, such as the fascia or console of the latter.

The lighter body 1 is mounted within the sleeve 7.

The plug 2 is lodged within the body 1, and includes a grasp cover member 9, which surrounds an annular body 10 having an accessible front face 14.

This body 10 is the body of a part 17, which is movable against a spring 20 that bears on a fixed guide 21 fixed to a ring member 11, which is formed with apertures 12.

The rear end portion 6, in the form of a finger, of the sleeve 7 is mounted in facing relationship to a window 5 of an opaque housing 3 which is carried by the finger 6.

This housing 3 includes a light source, which in this example is an electric light bulb 4.

In this example, the ring member 11 is opaque, and the apertures 12 allow light to pass through, the collar portion 8 being illuminated when the light 4 is lit. The body 10 is of a material which transmits light so that the light rays R from the apertures 12 are incident on the posterior face 13 of the body 10, and are refracted towards the front face 14.

When the body 10 is pushed in, the terminal shroud (not indicated with a reference numeral), which contains a heating resistance, comes into engagement with the bimetal fastening element so as to complete an electric circuit and heat up the heating resistance.

In a modified version, the cover member 9 may be omitted and the collar portion 8 may be visible.

In all cases, the rear zone of the illuminating sleeve acts as a light guide, and unwanted light is emitted towards the rear of the lighter body.

This light may be reflected by any part whatever of the fascia or transverse bulkhead of the vehicle, so as to emit undesirable light rays.

An object of the present invention is to overcome this drawback in a simple and inexpensive way.

According to the invention, an illuminating sleeve of the type described above is characterised in that the rear face of the illuminating sleeve is covered with an opaque mask.

This arrangement enables the emission of undesirable light rays to be avoided in a simple and inexpensive way.

In addition, more uniform luminosity is obtained in the region of the end collar portion of the illuminating sleeve which can be seen by the occupant of the vehicle. The mouth into which the plug is introduced is thus perfectly visible.

The mask may be made from a film which is deposited hot on the rear face of the illuminating sleeve. In another version, it may be in the form of paint deposited on the rear face of the illuminating sleeve, or of an opaque material which constitutes the rear face proper.

The following description illustrates the invention with reference to the attached drawings, in which.

For simplicity those elements which are common to the prior art and to the present invention will be given the same reference signs.

Figure 2:
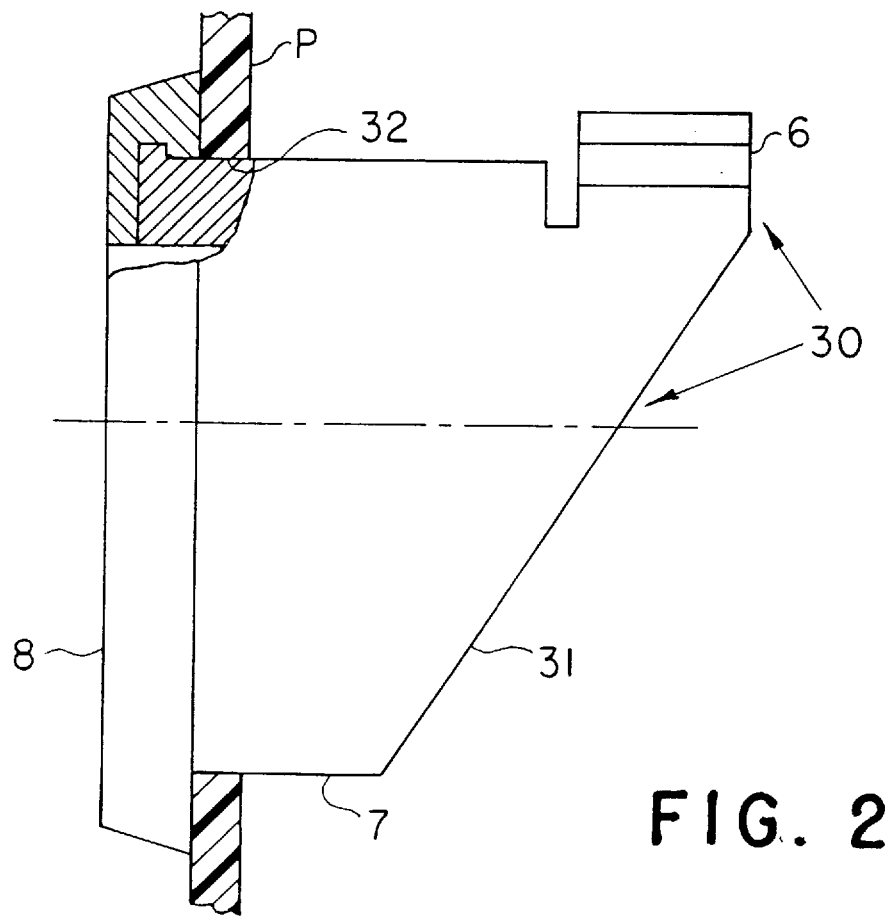
FIG. 2 is a view of the illuminating sleeve in accordance with the invention.

Thus, FIG. 2 shows at 7 the illuminating sleeve which is fixed on the fixed wall P of the vehicle, being inserted into the aperture 32 in the wall P, which is for example the fascia of the vehicle or a console of the latter.

In a modification it may consist of the transverse bulkhead of the vehicle.

The sleeve 7 is of a translucent, or even transparent, material, and is preferably of a synthetic material. It may for example be based on crystal polycarbonate or another material.

The sleeve 7 has a front collar portion 8 which is visible and which is in engagement on the fixed wall P. In this example, the sleeve is in two colours, with its collar portion 8 being of a material different from that of the body of the sleeve 7. This may be achieved by over-moulding.

The collar portion 8 is of a selected translucent coloured material which enables the light to be well homogenised in the region of the visible face of the illuminating sleeve. The sleeve 7 may of course be made of only one material.

Figure 1:
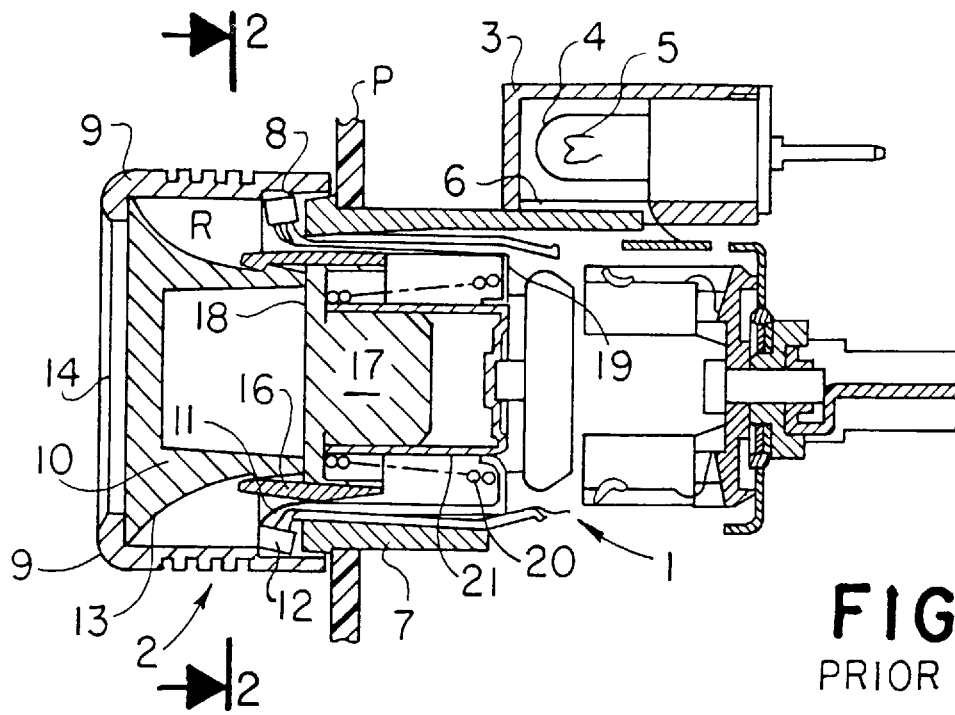
FIG. 1 is a view in axial cross section of a cigar lighter in accordance with the document FR-A-2 630 057.

The sleeve has a rear end portion 6 in the form of a claw having slider elements for fitting to it, in the manner of a drawer, a lamp housing containing an electric bulb, the housing being opaque and formed with a window which is directed into the inside of the sleeve in a manner similar to the arrangement described in FIG. 1. The rear face 31 of the sleeve is inclined.

The internal bore of the sleeve 7 serves for receiving the lighter body of FIG. 1.

As will have been understood, light is able to be emitted from the rear face 31 of this sleeve, in a direction away from the fixed wall P of the vehicle.

This light may be reflected by any part of the fascia or transverse bulkhead of the vehicle, and may give rise to undesirable emission of light rays.

In this connection, the invention proposes, in order to overcome this disadvantage, to cover the rear face 31 with an opaque mask 30. In this example the mask 30 is on the rear face 31 as well as the rear face of the end portion 6, the latter being in the form of fingers which serve to support the housing which contains the electric bulb or another light source.

This mask may consist of opaque paint deposited on the rear face 31 of the sleeve 7 and the rear face of the end portion 6. The deposit may be effected for example by hot printing, offset printing or screen process printing. In another version, it may consist of an opaque film deposited hot on the rear face 31 of the sleeve 7. In a further version, the sleeve 7 may be made of a plurality of materials, and may include in the region of its rear face 31 a zone of an opaque material which constitutes the rear face proper. In another version, it may consist of an opaque film moulded on the rear face 31.

The invention prevents the unwanted emission of light in a direction away from the fixed wall P of the vehicle, and the collar portion 8 of the sleeve 7 is homogenised due to the minimisation of light losses which are obtained by virtue of the invention.

In addition, driving safety of the vehicle is improved.

The rear end portion 6 may of course be offset axially with respect to the rear face 31.

Thus, it can be that the rear face of the end portion 6 is not an extension of the rear face 31.

In general terms, the rear face is illuminated by the light source, either directly as in FIG. 1, or indirectly.

I claim:

1. An illuminating sleeve for a cigar lighter, in particular for a motor vehicle, including a front face in the form of a collar portion, a rear end portion on the illuminating sleeve, a light source for illuminating said rear end portion wherein the invention comprises a rear face, and an opaque mask for the rear face of the illuminating sleeve to attenuate light transmission through the rear face.

2. An illuminating sleeve according to claim 1, characterized in that the mask further comprises an opaque mask for the rear end portion of the illuminating sleeve.

3. An illuminating sleeve according to claim 1, characterized in that the mask comprises an opaque paint on the rear face of the sleeve.

4. An illuminating sleeve according to claim 1, characterized in that the mask comprises an opaque film deposited hot on the rear face of the sleeve.

5. An illuminating sleeve according to claim 1, wherein the rear face further comprises a zone of opaque material.

6. An illuminating sleeve according to claim 1, characterized in that the mask comprises an opaque film molded on the rear face of the illuminated sleeve.

* * * * *